United States Patent [19]

Demura et al.

[11] Patent Number: 5,249,013
[45] Date of Patent: Sep. 28, 1993

[54] DISTANCE MEASURING DEVICE OF CAMERA

[75] Inventors: Motokuni Demura; Takashi Hongoh, both of Kawasaki; Keiichi Ikebe, Yokohama; Yoshio Nakamura, Shiroi; Daisuke Kishida, Kawasaki, all of Japan

[73] Assignee: Ricoh Company, Ltd., Tokyo, Japan

[21] Appl. No.: 734,185

[22] Filed: Jul. 22, 1991

[30] Foreign Application Priority Data

| Jul. 23, 1990 | [JP] | Japan | 2-193149 |
| Jul. 23, 1990 | [JP] | Japan | 2-193150 |
| Jul. 30, 1990 | [JP] | Japan | 2-199081 |
| Jan. 30, 1991 | [JP] | Japan | 3-009695 |

[51] Int. Cl.⁵ ............................. G03B 13/36
[52] U.S. Cl. ............................. 354/404
[58] Field of Search ............. 354/404, 405

[56] References Cited

U.S. PATENT DOCUMENTS

| 3,435,744 | 4/1969 | Stimson | 354/403 |
| 3,442,193 | 5/1969 | Pagel | 354/403 |
| 3,723,003 | 3/1973 | Vockenhuber | 354/403 |
| 3,958,117 | 5/1976 | Stauffer | 354/404 |
| 4,183,640 | 1/1980 | Abe | 354/404 |
| 4,470,681 | 9/1984 | Johnson | 354/403 |
| 4,922,281 | 5/1990 | Kitajima | 354/404 |

FOREIGN PATENT DOCUMENTS

| 58-93040 | 6/1983 | Japan . |
| 58-135411 | 8/1983 | Japan . |
| 60-217321 | 10/1985 | Japan . |
| 1-57891 | 12/1989 | Japan . |

*Primary Examiner*—Russell E. Adams
*Attorney, Agent, or Firm*—Oblon, Spivak, McClelland, Maier & Neustadt

[57] ABSTRACT

In a distance measuring device of a camera, a distance measuring optical system unit has light-emitting and light-receiving elements for distance measurement. The distance measuring optical system unit is rotated from one end of a photographing screen to the other end thereof to perform a distance measuring operation. The distance measuring optical system unit is rotated and stopped in a set distance measuring range by a cam rotated by a DC motor and a driven arm portion of the distance measuring optical system unit. Distance measuring object ranges of the distance measuring optical system unit are switched by a switch. For example, the distance measuring object ranges are set with respect to many-point distance measurement or one-point distance measurement.

5 Claims, 9 Drawing Sheets

Fig. 12
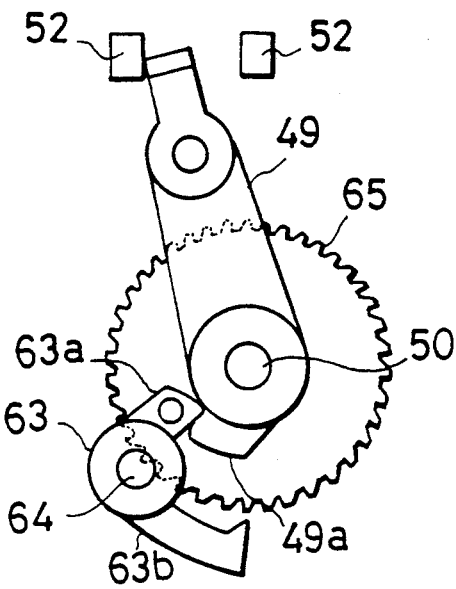
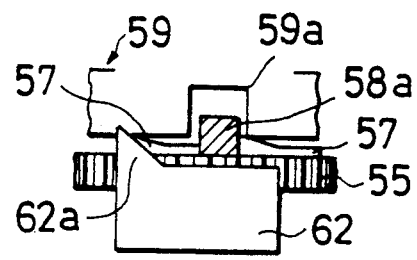
Fig. 13a
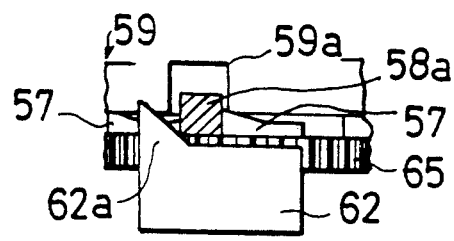
Fig. 13b
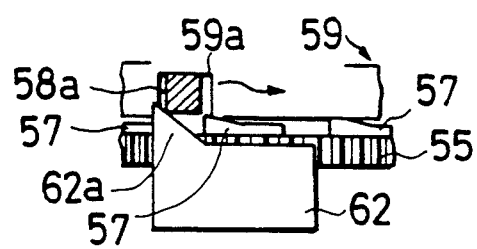
Fig. 13c
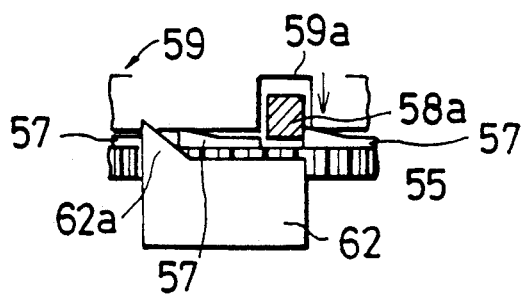
Fig. 13d

DISTANCE MEASURING DEVICE OF CAMERA

BACKGROUND OF THE INVENTION

1. Field of the Invention

The present invention relates to a distance measuring device disposed in a camera to measure a distance from the camera to a photographed object.

2. Description of the Related Art

Japanese Patent Application Laying Open (KOKAI) No. 60-217321 and Japanese Patent Publication (KOKOKU) No. 1-57891 show an automatic focusing camera for measuring distances between many points. In this automatic focusing camera, a distance measuring means is moved from one end of a photographing screen to the other end thereof so as to easily focus a photographing lens with respect to a photographed object in any position thereof on the photographing screen.

In the above camera, since the distances between many points are measured, it is possible to prevent so-called intermediate defocusing in which the photographing lens is focused with respect to a background of the photographed object when a distance from the camera to the photographed object is measured at only one point. However, when a one-point distance measuring operation is released, the distance measuring means is automatically moved as mentioned above. Accordingly, there is a case in which no focusing operation can be instantly performed with respect to a specified object to be photographed.

To solve this problem, it is considered to construct the distance measuring device such that the distance measuring device performs both the many-point distance measuring operation and the one-point distance measuring operation. However, such a distance measuring device has various kinds of problems.

Namely, it is not necessary to move the distance measuring means in the one-point distance measuring operation. Further, it is necessary to stop the distance measuring means so as to perform the distance measuring operation, and a focusing lock is required. In the many-point distance measuring operation, it is necessary to move the distance measuring means and no focusing lock is required. Accordingly, the distance measuring device must have a structure corresponding to these distance measuring operations.

When a focusing lock function is added to the camera in the general many-point distance measuring operation, a driving sound is generated by the operation of a mechanical system when the distance measuring means is moved. This driving sound is generated when a first releasing operation of the camera is started. Therefore, an operator of the camera misunderstands that a shutter of the camera is released. Accordingly, there is a problem that the shutter of the camera cannot be reliably released in a certain case.

Further, in the above automatic focusing camera, a resetting operation of the camera with respect to the movement of the distance measuring means in a distance measuring range thereof is performed in association with the winding-up operation of a film in the camera. When a multiple exposure operation is performed, the above resetting operation must be performed irrespective of the winding-up operation of the film. Accordingly, it is impossible to cope with such a situation in the case of the above automatic focusing camera.

There is a distance measuring method of a light-emitting type in which light emitted from a light-emitting element is received by a light-receiving element to perform a distance measuring operation. In this distance measuring method, the distance measuring operation is performed many times at one point to improve an accuracy in distance measurement. An average value of these measured results is used to determine the distance between the camera and the photographed object. A time of several ten milliseconds per one point is normally required in such multiple light emission. Therefore, it is necessary to make a distance measuring optical system at rest in the course of this light emission. However, the above automatic focusing camera has a problem about reliability in data since the distance measuring optical system is continuously moved.

SUMMARY OF THE INVENTION

It is therefore an object of the present invention to provide a distance measuring device of a camera in which a distance measuring operation can be performed suitably and reliably in accordance with the intention of an operator.

The above object can be achieved by a distance measuring device of a camera comprising a rotatable distance measuring optical system unit moved from one end of a photographing screen to the other end thereof to perform a distance measuring operation; and driving means for rotating the distance measuring optical system unit; the distance measuring device being constructed such that the distance measuring optical system unit is stopped or returned to a predetermined position by the driving means after the rotation of the distance measuring optical system unit so as to perform the distance measuring operation.

Concretely, in accordance with a first structure of the present invention, the distance measuring device of a camera comprises a rotatable distance measuring optical system unit moved from one end of a photographing screen to the other end thereof to perform a distance measuring operation; driving means for rotating the distance measuring optical system unit; and switching means for changing distance measuring object ranges of the distance measuring optical system unit rotated and stopped by the driving means.

In accordance with a second structure of the present invention, the distance measuring optical system unit is rotated and stopped by stages by the driving means and the distance measuring object ranges with respect to one-point distance measurement and many-point distance measurement are switched by the switching means, and the rotation of the distance measuring optical system unit is stopped on a central portion of the photographing screen so as to perform the distance measuring operation at a time of the one-point distance measurement.

In accordance with a third structure of the present invention, the distance measuring device further comprises a first stage release switch, a second stage release switch, and control means for controlling the distance measuring operation of the distance measuring optical system unit such that the distance measuring operation is started from an operation of the first stage release switch or an operation of the second stage release switch in accordance with the distance measuring object ranges.

In accordance with a fourth structure of the present invention, the distance measuring operation of the distance measuring optical system unit is started by the control means from the operation of the second stage release switch at a time of the many-point distance measurement, and is started by the control means from the operation of the first stage release switch at the time of the one-point distance measurement.

In accordance with a fifth structure of the present invention, the rotation of the distance measuring optical system unit is stopped by operating the switching means so as to perform the distance measuring operation at the time of the one-point distance measurement.

In accordance with a sixth structure of the present invention, the distance measuring device of a camera comprises a rotatable distance measuring optical system unit moved from one end of a photographing screen to the other end thereof to perform a distance measuring operation; and driving means for rotating the distance measuring optical system unit; the distance measuring device being constructed such that the distance measuring optical system unit is rotated by the driving means from a standby position by performing a releasing operation thereof and is returned to the standby position irrespective of the releasing operation after the distance measuring optical system unit is rotated a predetermined angle.

In accordance with a seventh structure of the present invention, the distance measuring optical system unit can be rotated by stages by the driving means and can be at rest at each of rotating stages.

In accordance with an eighth structure of the present invention, the driving means has excessive rotation preventing means constructed such that the distance measuring optical system unit is at rest at each of the rotating stages.

In accordance with a ninth structure of the present invention, the distance measuring optical system unit is constructed by light-emitting and light-receiving elements and at least one of optical paths with respect to the light-emitting and light-receiving elements is bent to obtain a space for arranging the driving means.

In accordance with the first structure of the present invention, the distance measuring optical system unit is moved from one end of the photographing screen to the other end thereof to perform a distance measuring operation. The distance measuring object ranges of the distance measuring optical system unit are changed by the switching means. Accordingly, the distance measuring object ranges can be changed in accordance with the intention of an operator.

Further, it is possible to switch the many-point distance measurement and the one-point distance measurement in which the distance measuring optical system unit is at rest on a central portion of the photographing screen to perform a focusing lock. Accordingly, a focusing operation is instantly performed by the one-point distance measurement with respect to a specified photographed object.

The distance measuring operation is started from the operation of the first or second stage release switch in accordance with the distance measuring object ranges. Accordingly, the distance measuring operation can be performed at a suitable time in accordance with a distance measuring state.

At the time of the many-point distance measurement, no distance measuring optical system unit is operated when the first stage release switch is turned on. Accordingly, no operating sound is generated at this time. The distance measuring operation is started by the operation of the distance measuring optical system unit by turning on the second stage release switch. Accordingly, it is possible to prevent an operator from misunderstanding that a shutter is released when the first stage release switch is turned on. Further, at the time of the one-point distance measurement, the distance between the camera and a photographed object is measured by turning on the first stage release switch. Accordingly, the focusing operation can be instantly performed with respect to a specified photographed object.

The focusing lock is performed at the time of the one-point distance measurement in which the distance measuring operation is started by the operation of the first stage release switch. Accordingly, it is possible to reliably take a photograph with free composition in a state in which the focusing operation is performed with respect to the specified photographed object.

Further, in accordance with the sixth structure of the present invention, the position of the distance measuring optical system unit can be reset to a standby position irrespective of the releasing operation after the distance measuring optical system unit is rotated a predetermined angle to perform the distance measuring operation. Accordingly, it is possible to perform a pre-focusing operation in the distance measuring device and cope with multiple exposure.

Since the distance measuring optical system unit is rotated by stages and can be at rest at each of rotating stages, it is possible to exactly perform the many-point distance measurement by emitting light multiple times.

Further, the distance measuring optical system unit can be reliably at rest by the excessive rotation preventing means in a predetermined position at each of the rotating stages. Accordingly, the distance measuring optical system unit can be rotated at a high speed and the distance measuring operation can be performed at a high speed.

In accordance with the ninth structure of the present invention, the light-emitting and light-receiving elements constitute the distance measuring optical system unit in each of the above first and sixth structures, and optical paths with respect to the light-emitting and light-receiving elements are bent to form a space portion for arranging the driving means. Accordingly, constructional members of the distance measuring device can be stored within a relatively small space without increasing the size of the camera.

Further objects and advantages of the present invention will be apparent from the following description of the preferred embodiments of the present invention as illustrated in the accompanying drawings.

BRIEF DESCRIPTION OF THE DRAWINGS

FIG. 12 is a constructional view showing a main portion of the lower structure of the ratchet wheel shown in FIG. 9;

FIGS. 13a, 13b, 13c and 13d are views for explaining a resetting operation of the distance measuring device in the second embodiment of the present invention;

DESCRIPTION OF THE PREFERRED EMBODIMENTS

The preferred embodiments of a distance measuring device of a camera in the present invention will next be described in detail with reference to the accompanying drawings.

Figure 1:
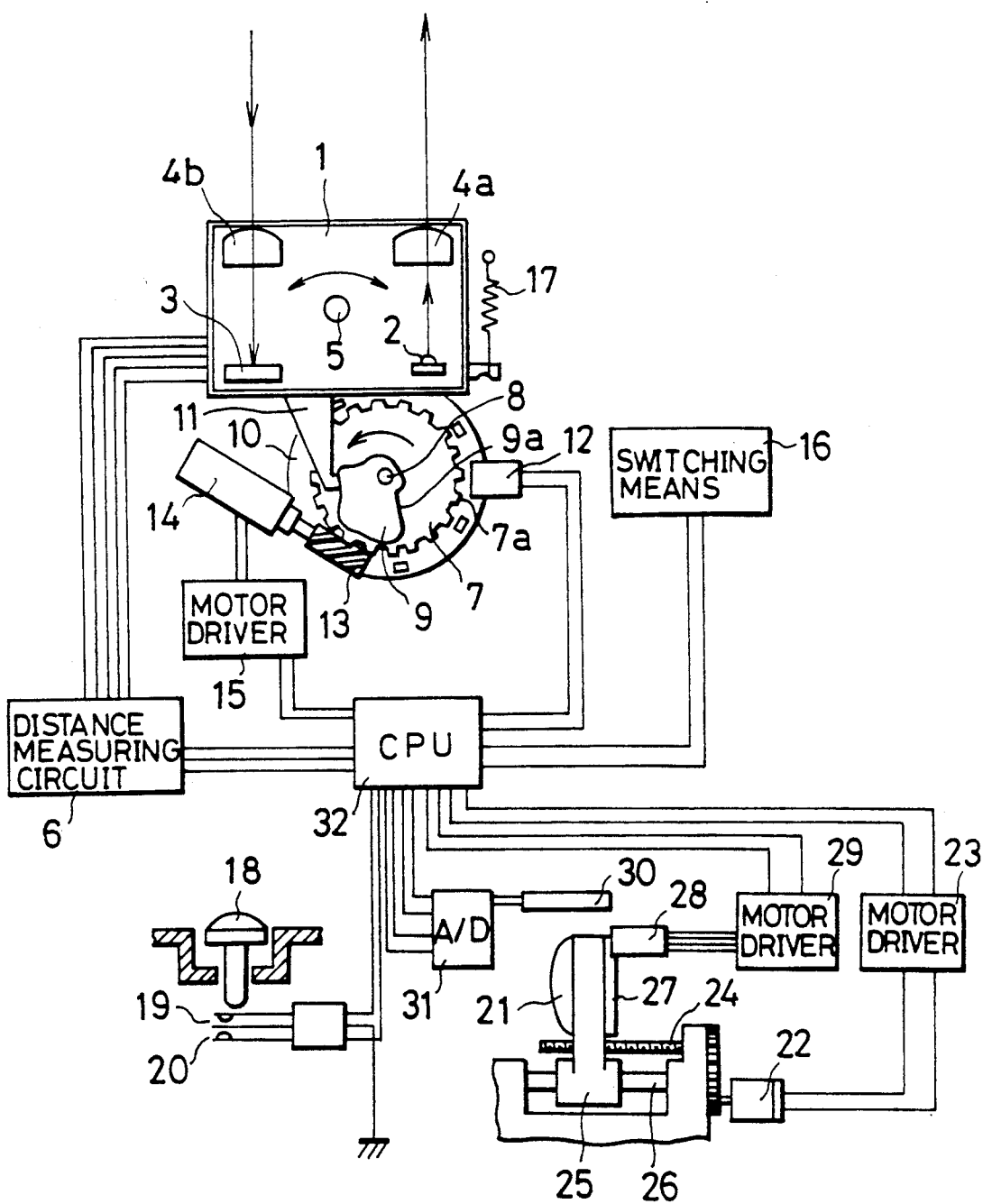
FIG. 1 is a view showing the entire construction of a distance measuring device of a camera in accordance with a first embodiment of the present invention.

FIG. 1 is a view showing the entire construction of a distance measuring device of a camera in accordance with a first embodiment of the present invention. In FIG. 1, a light-emitting element 2 and a light-receiving element 3 are disposed within a distance measuring optical system unit 1. Condenser lenses 4a and 4b are respectively arranged in front of the light-emitting element 2 and the light-receiving element 3. A support shaft 5 rotatably supports the distance measuring optical system unit 1. A distance measuring circuit 6 receives an output of the distance measuring optical system unit 1 and calculates a distance between the camera and a photographed object. A worm wheel 7 is adjacent to the distance measuring optical system unit 1 and is rotated around a central shaft 8. A cam 9 is fixed onto an upper face of the worm wheel 7.

A photo-encoder disk 10 is fixed onto a lower face of the worm wheel 7. A driven arm portion 11 is projected from a side portion of the distance measuring optical system unit 1 and comes in contact with a side face 9a of the cam 9. A photo-encoder 12 is opposed to a circumferential portion of the photo-encoder disk 10. A worm gear 13 is engaged with a teeth portion 7a disposed in an outer circumferential portion of the worm wheel 7. A DC motor 14 rotates the worm gear 13. A motor driver 15 is disposed to drive the DC motor 14. A switch 16 is disposed as a means for switching distance measuring object ranges described later. A biasing spring 17 pulls the distance measuring optical system unit 1 in a constant direction such as the counterclockwise direction. A first stage release switch 19 and a second stage release switch 20 are turned on by a release button 18 by stages.

Reference numerals 21 and 22 respectively designate a photographing lens and a motor for focus. A motor driver 23 is disposed to drive the motor 22 for focus. A driving gear body 24 is driven by the motor 22 for focus. A holding body 25 holds the photographing lens 21 and is guided by a guide shaft 26 and is transversally moved by the driving gear body 24. Reference numerals 27 and 28 respectively designate a shutter portion and a motor for shutter. A motor driver 29 is disposed to drive the motor 28 for shutter.

An encoder 30 for detecting a position of the photographing lens detects a moving position of the holding body 25. Reference numeral 31 designates an A/D (analog/digital) converter. A central processing unit (CPU) 32 as a control means is connected to the distance measuring circuit 6, the photo-encoder 12, the motor drivers 15, 23, 29, the switching means 16, the first stage release switch 19, the second stage release switch 20, and the encoder 30 for detecting a position of the photographing lens through the A/D converter 31.

Figure 2:
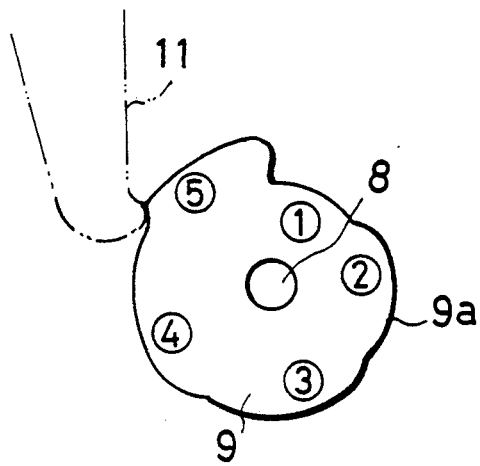
FIG. 2 is a view for explaining the shape of a cam disposed in the distance measuring device shown in FIG. 1.
Figure 3:
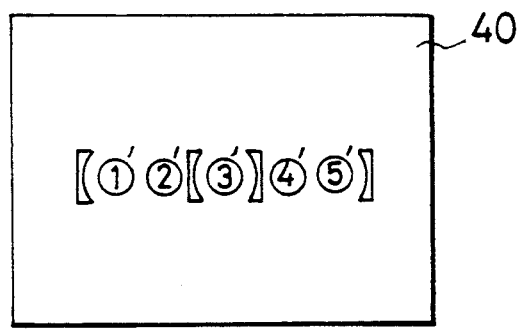
FIG. 3 is an explanatory view showing distance measuring object ranges within a finder corresponding to the shape of the cam shown in FIG. 2.

FIG. 2 is a view for explaining a shape of the cam 9. FIG. 3 is a view for explaining a finder 40 and distance measuring object ranges. In FIG. 2, a plurality of cam side faces 9a are formed on a side of the cam 9 and diametrical lengths of the cam side faces 9a from a center of the central shaft 8 are different from each other. In this embodiment, the cam side faces 9a is constructed by five side faces shown by ①︎ to ⑤︎. The distance measuring optical system unit 1 is rotated on these five cam side faces 9a through the driven arm portion 11 as described later. Thus, a distance measuring operation is performed with respect to five distance measuring object ranges within the finder 40 shown by ①︎' to ⑤︎' in FIG. 3 and corresponding to the above five cam side faces 9a shown by ①︎ to ⑤︎.

A driving means of the distance measuring optical system unit 1 is constructed by the worm wheel 7, the cam 9, the driven arm portion 11, the worm gear 13 and the DC motor 14.

A basic operation of the distance measuring device in the above first embodiment will next be described.

When the release button 18 is pushed, the first stage release button 19 and the second stage release button 20 are turned on as described later. Thus, a driving signal is outputted from the central processing unit 32 to the motor driver 15. The DC motor 14 is then driven and the worm gear 13 is rotated. The worm wheel 7 is rotated around the central shaft 8 by rotating the worm gear 13. The cam 9 and the photo-encoder disk 10 are rotated by rotating the worm wheel 7. Thus, the driven arm portion 11 is pressed on the five side faces 9a of the cam 9 at five stages. The distance measuring optical system unit 1 is rotated around the support shaft 5. As is well known, in each of the distance measuring object ranges shown by ①︎' to ⑤︎', the distance between the camera and the photographed object is calculated by the distance measuring circuit 6 from an output of the distance measuring optical system unit 1 based on optical changes in light of the light-emitting element 2 emitted to the photographed object and light of the light-receiving element 3 reflected from the photographed object. The rotation of the photo-encoder disk 10 is detected by the photo-encoder 12. The photo-encoder 12 outputs a control signal for stopping the movement of the distance measuring optical system unit 1 to the central processing unit 32 in each of the distance measuring object ranges shown by ①' to ⑤'.

When the distance measuring operation is performed as mentioned above and distance measuring data of the target photographed object are outputted to the central processing unit 32, the motor 32 for focus is driven through the motor driver 23. Thus, the driving gear body 24 is rotated to move the holding body 25 and the photographing lens 21. The movement of the photographing lens 21 is detected by the encoder 30 for detecting a position of the photographing lens. When the photographing lens 21 is moved until a position corresponding to the distance measuring data, a stopping signal is outputted from the central processing unit 32 to the motor driver 23. Thus, the rotation of the motor 22 for focus is stopped so that the movement of the photographing lens 21 is stopped. Then, a shutter signal is outputted from the central processing unit 32 to the motor driver 29 so that the shutter portion 27 is opened and closed by the motor 28 for shutter for a predetermined time. Thereafter, an unillustrated film is supplied in the camera.

Figure 4:
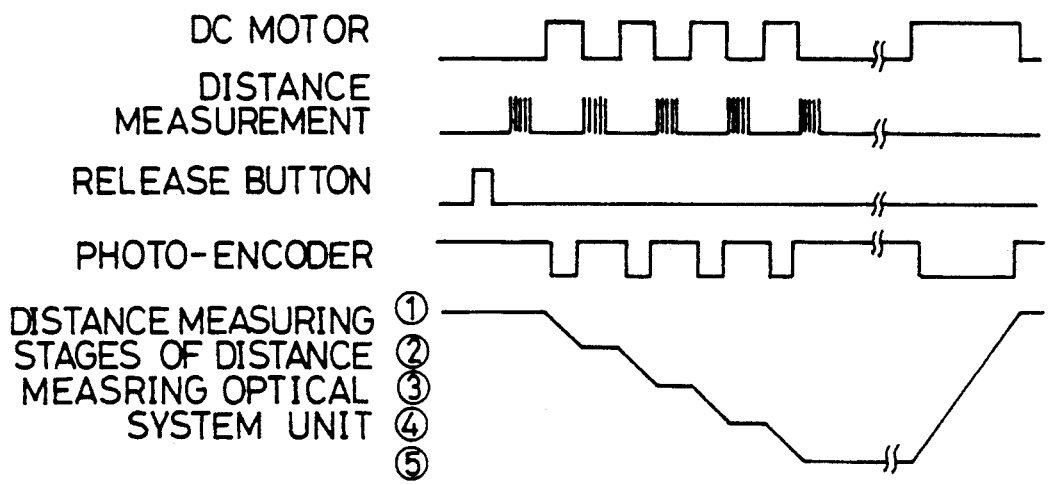
FIG. 4 is a timing chart with respect to a basic operation of many-point distance measurement in the first embodiment of the present invention.

A basic operation of many-point distance measurement in the distance measuring device in the above first embodiment will next be described with reference to the timing chart shown in FIG. 4.

A many-point distance measuring mode is selected by the switch 16. When the release button 18 is turned on, the driven arm portion 11 is located on the first cam side face 9a shown by ① in a home position. Accordingly, in this state, a distance measuring operation is performed in the first distance measuring object range shown by ①'. When this distance measuring operation is completed, a driving signal is outputted from the central processing unit 32 to the motor driver 15 so as to drive the DC motor 14. When the photo-encoder 12 detects that the driven arm portion 11 is located on the second cam side face 9a shown by ②, the rotation of the DC motor 14 is stopped and the distance measuring operation is performed in this state in the second distance measuring object range shown by ②'. Thereafter, the distance measuring operation is similarly performed sequentially from the third distance measuring object range shown by ③' to the fifth distance measuring object range shown by ⑤'.

Then, the photographing lens is drawn out and the shutter is operated in accordance with the distance between the camera and the target photographed object. Thereafter, the DC motor 14 is turned on and the cam 9 is rotated such that the driven arm portion 11 is located on the first cam side face 9a shown by ① in the home position.

Figure 5:
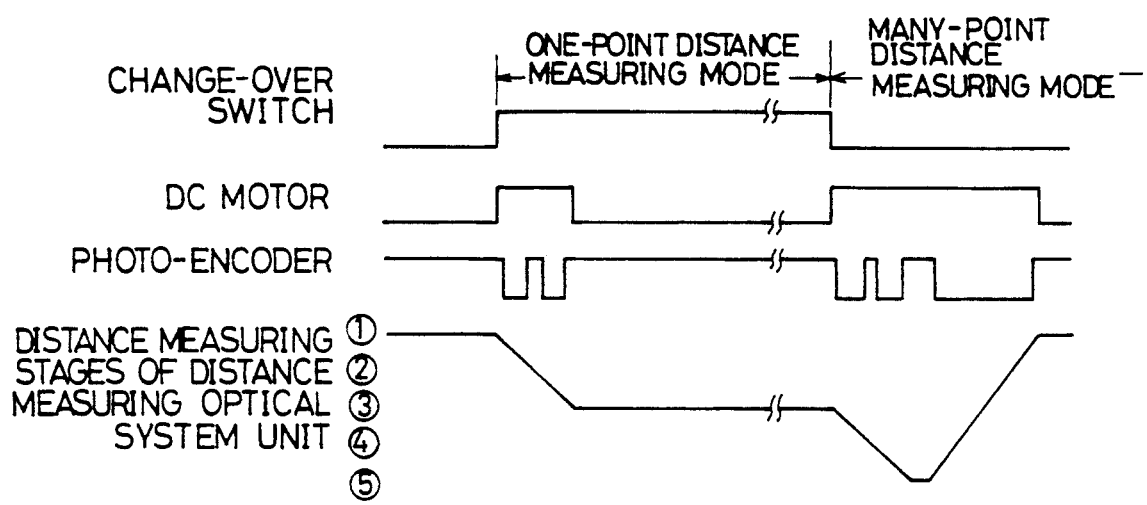
FIG. 5 is a timing chart with respect to an operation for switching the many-point distance measurement and one-point distance measurement in the first embodiment of the present invention.

An operation for switching the many-point distance measurement and one-point distance measurement in the first embodiment will next be described with reference to the timing chart shown in FIG. 5.

When the switch 16 is switched from the many-point distance measuring mode to a one-point distance measuring mode to a one-point distance measuring mode, a driving signal is outputted from the central processing unit 32 to the motor driver 15 so as to drive the DC motor 14. The rotation of the DC motor 14 is stopped when the photo-encoder 12 detects that the driven arm portion 11 is located on the third cam side face 9a shown by ③ and corresponding to a central portion of a photographing screen. When the release switch is turned on, the distance measuring operation is performed in the third distance measuring object range shown by ③'.

The DC motor 14 is driven when the switch 16 is switched from the one-point distance measuring mode to the many-point distance measuring mode. The rotation of the DC motor 14 is stopped when the photo-encoder 12 detects that the driven arm portion 11 is located on the first cam side face 9a shown by ①. Thereafter, the distance measuring device is operated in accordance with the above timing chart shown in FIG. 4.

Figure 6:
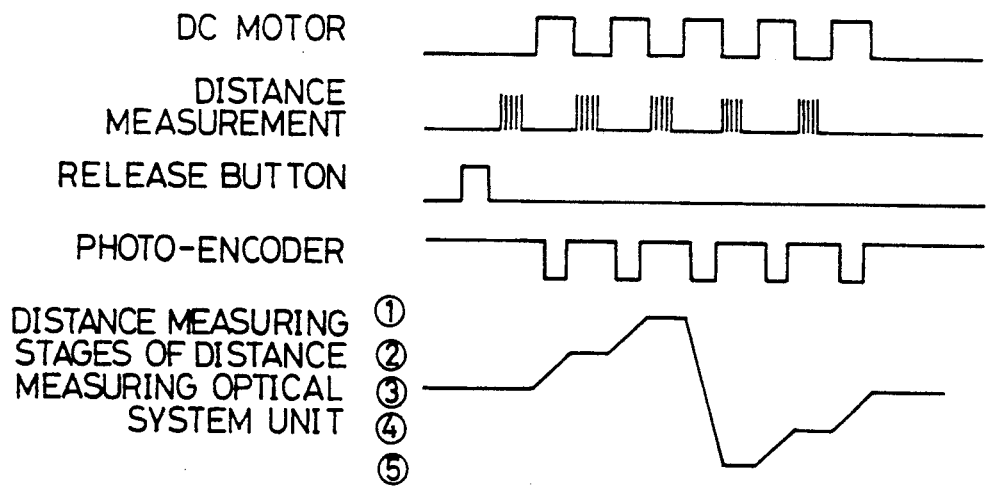
FIG. 6 is a timing chart showing another example of a method for controlling an operation of the cam in the first embodiment of the present invention.

FIG. 6 is a timing chart showing another example of a method for controlling the operation of the cam. In this example, the driven arm portion 11 of the distance measuring optical system unit 1 is located on the third side face 9a of the cam 9 shown by ③ at any time when the distance measuring operation is started. The position of the third cam side face 9a is set to a home position of the driven arm portion 11. The distance measuring operation is controlled by the central processing unit 32 such that the distance measuring operation is performed from the third cam side face ③ to the fifth cam side face ⑤ and the fourth cam side face ④ through the second cam side face ② and the first cam side face ①. Thus, no DC motor 14 is driven when the many-point distance measurement and the one-point distance measurement are switched.

When the above control method is used in the first embodiment of the present invention, it is possible to change the distance measuring object ranges of the distance measuring optical system unit moved from one end of the photographing screen to the other end thereof to perform the distance measuring operation. For example, the distance measuring object ranges can be changed such that the many-point distance measuring operation and the one-point distance measuring operation can be performed. In the many-point distance measuring operation, intermediate defocusing, etc. can be prevented and no photograph is usually taken in a defocusing state. Further, when a focusing operation is performed with respect to a specified photographed object, the focusing operation can be instantly performed by the one-point distance measurement. Accordingly, it is possible to perform the distance measuring operation required in accordance with the intention of an operator.

Figure 7:
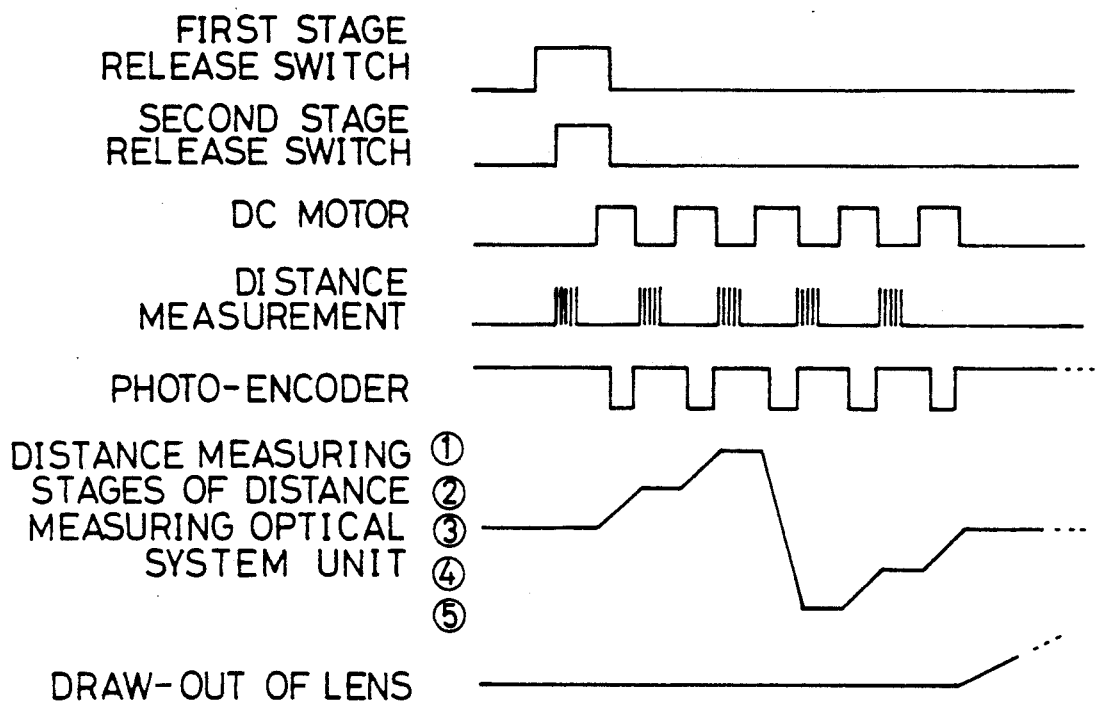
FIG. 7 is a timing chart showing a relation between the many-point distance measurement and operations of first and second stage release switches.
Figure 8:
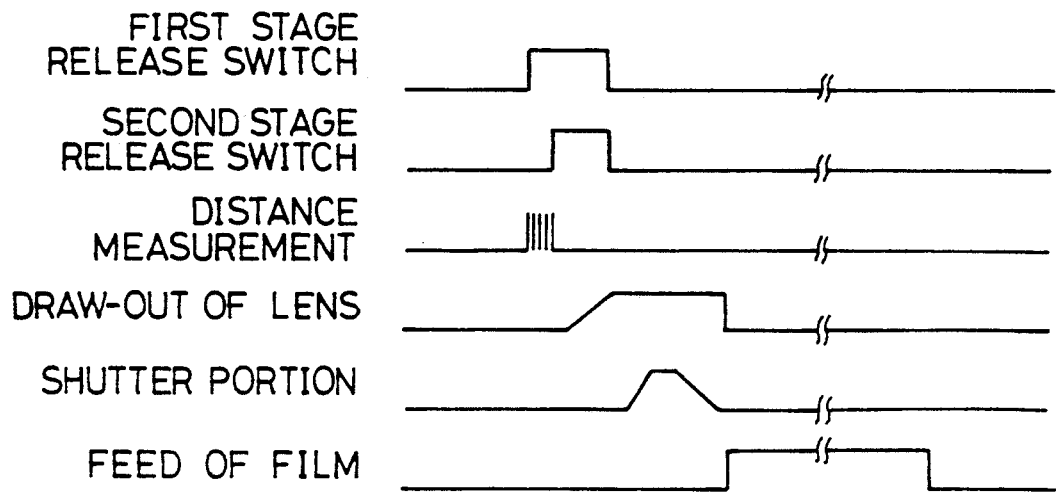
FIG. 8 is a timing chart showing another relation between the many-point distance measurement and the operations of the first and second stage release switches.

FIGS. 7 and 8 are timing charts showing a control method in which the distance measuring operation is performed at a predetermined timing by operating the first stage release switch 19 and the second stage release switch 20.

FIG. 7 shows a timing chart when the many-point distance measuring operation is performed. The many-point distance measuring mode is selected by the switch 16. When the release button 18 is pushed, the first stage release switch 19 is turned on and the second stage release switch 20 is then turned on. When an electric signal indicative of the turning-on operation of the second stage release switch is outputted to the central processing unit 32, the driven arm portion 11 is located on the third cam side face 9a shown by ③ in the home position and the distance measuring operation is performed in this state in the third distance measuring object range shown by ③'. When this distance measuring operation is completed, a driving signal is outputted from the central processing unit 32 to the motor driver 15 so as to drive the DC motor 14. The rotation of the DC motor 14 is stopped when the photo-encoder 12 detects that the driven arm portion 11 is located on the second cam side face 9a shown by ②. In this state, the distance measuring operation is performed in the second distance measuring object range shown by ②'. Thereafter, the distance measuring operation is similarly performed sequentially in the first, fifth and fourth distance measuring object ranges respectively shown by ①', ⑤' and ④'.

When the distance measuring operation is completely performed in all the distance measuring object ranges shown by ①' to ⑤', the photographing lens 21 is drawn out and the shutter 27 is opened and closed in accordance with the distance between the camera and the target photographed object. The cam 9 is rotated such that the driven arm portion 11 is located on the third cam side face 9a shown by ③ in the home position.

FIG. 8 shows a timing chart at a time of the one-point distance measurement. The one-point distance measuring mode is selected by the switch 16. When the release button 18 is pushed and the first stage release switch 19 is turned on, an electric signal indicative of this turning-on operation is outputted to the central processing unit 32. At this time, the driven arm portion 11 is held on the third cam side face 9a shown by ③ in the home position. Accordingly, in only this state, the distance measuring operation is performed in the third distance measuring object range shown by ③' and a focusing lock is performed.

Next, when an electric signal indicative of a turning-on operation of the second stage release switch 20 is outputted to the central processing unit 32, the photographing lens 21 is drawn out and the shutter 27 is opened and closed in accordance with the distance between the camera and the target photographed object. Thereafter, the feeding operation of a film is performed.

When the many-point distance measuring operation is performed by using the control method explained with reference to FIG. 7, no operating sound is caused when the first stage release switch 19 is turned on. Accordingly, there is no case in which an operator misunderstands that this sound is a sound for opening and closing the shutter. Further, the shutter is reliably released by turning on the second stage release switch 20.

When the one-point distance measuring operation is performed by using the control method explained with reference to FIG. 8, the distance measuring operation is performed by turning on the first stage release switch 19 and the focusing lock can be performed. Accordingly, it is possible to easily and reliably perform a focusing operation with respect to a specified photographed object.

Figure 9:
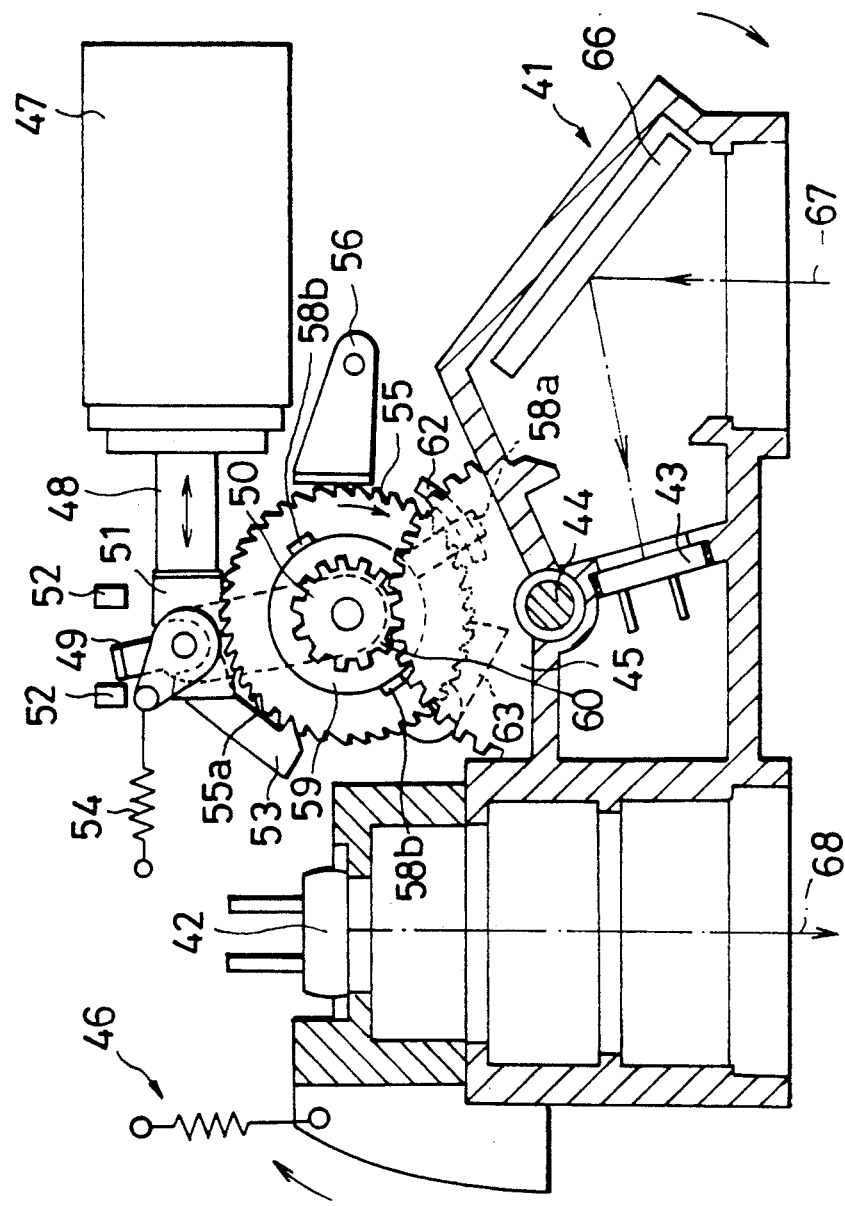
FIG. 9 is a constructional view showing a main portion of a distance measuring device of a camera in accordance with a second embodiment of the present invention.

FIG. 9 is a constructional view showing a main portion of a distance measuring device of a camera in accordance with a second embodiment of the present invention. In FIG. 9, a distance measuring optical system unit 41 has a light-emitting element 42 and a light-receiving element 43 therein. A support shaft 44 rotatably supports the distance measuring optical system unit 41. A sector gear 45 is fixed to a side portion of the distance measuring optical system unit 41. A biasing spring 46 biases the distance measuring optical system unit 41 such that the distance measuring optical system unit 41 is rotated around the support shaft 44 in the clockwise direction. Reference numerals 47 and 48 respectively designate a solenoid device and a plunger thereof. A lever 49 is rotatably disposed around a central shaft 50 and is connected to the plunger 48 through a connection member 51. A pair of stoppers 52 are opposed to both sides of the lever 49 at an upper end thereof. A driving claw 53 is fixed to the lever 49. A return spring 54 biases the lever 49 and the driving claw 53 such that the lever 49 and the driving claw 53 are rotated around the central shaft 50 in the counterclockwise direction. A ratchet wheel 55 is rotatably disposed around the central shaft 50. The ratchet wheel 55 has a plurality of ratchet teeth 55a in a circumferential portion thereof. The ratchet teeth 55a are engaged with the driving claw 53. An anti-reverse rotation body 56 is engaged with the ratchet teeth 55a to prevent the ratchet wheel 55 from being rotated in a reverse direction (in the counterclockwise direction in this embodiment).

Figure 10:
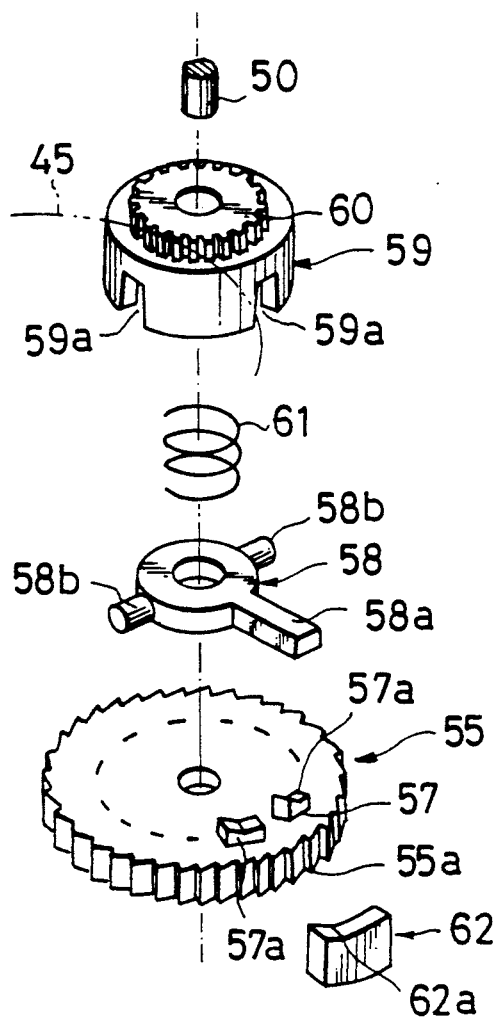
FIG. 10 is an exploded perspective view of the upper structure of a ratchet wheel shown in FIG. 9.

FIG. 10 is an exploded perspective view of an upper structure of the ratchet wheel. In FIG. 10, a plurality of connection claws 57 are fixedly spaced from each other on a concentric circle on an upper face of the ratchet wheel 55. A slanting projection 57a is formed at one end of each of the connection claws 57. A connector 58 is rotatably disposed around the central shaft 50. The connector 58 has a connection projecting portion 58a engaged with the connection claws 57 and has a pair of bosses 58b. A driving cylindrical body 59 is rotatably disposed around the central shaft 50. A gear portion 60 is fixed to an upper portion of the driving cylindrical body 59 and is engaged with the sector gear 45. The driving cylindrical body 59 has grooves 59a in side portions thereof. The grooves 59a are formed such that the connection projecting portion 58a and the bosses 58b are inserted into these grooves and can be moved upward and downward within these grooves. A pressure spring 61 presses the connector 58 toward the upper face of the ratchet wheel 55. A reset cam 62 has an operation slanting portion 62a engaged with the connection projecting portion 58a to raise the connector 58.

Figure 11:
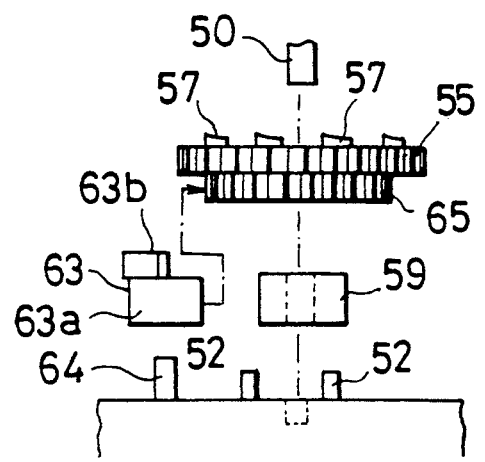
FIG. 11 is an exploded side view of a lower structure of the ratchet wheel shown in FIG. 9.

FIG. 11 is an exploded side view of a lower structure of the above ratchet wheel. FIG. 12 is a constructional view showing a main portion of the lower structure of the ratchet wheel. In FIGS. 11 and 12, a brake claw body 63 has a brake arm portion 63a engaged with a projecting arm 49a of the lever 49 and has a projected brake claw portion 63b. The brake claw body 63 is rotatably supported by a shaft 64 therearound and constructs an excessive rotation preventing means. A brake ratchet portion 65 is fixed onto a lower face of the ratchet wheel 55 and is engaged with the brake claw portion 63b.

Biasing force is applied by an unillustrated spring to the above anti-reverse rotation body 56 in a direction in which a portion of the driving claw 53 is moved and engaged with the ratchet teeth 55a. Further, biasing force is applied by an unillustrated spring to the brake claw body 63 in a direction in which the brake claw portion 63b is separated from the brake ratchet portion 65.

The operation of the distance measuring device of a camera in accordance with the above second embodiment of the present invention will next be described.

When a releasing operation of the distance measuring optical system unit 41 is performed in a standby state shown in FIG. 9, the distance measuring optical system unit 41 is rotated around the support shaft 44 in the clockwise direction as described later. In the meanwhile, light is emitted from the light-emitting element 42 and light reflected from a photographed object is received by the light-receiving element 43, thereby performing a well-known distance measuring operation. The light emitted from the light-emitting element 42 is moved from one end of a photographing screen to the other end thereof so as to perform the distance measuring operation in a wide range.

Concretely, when the above releasing operation is performed, the solenoid device 47 is operated and pulls the plunger 48. The solenoid device 47 then rotates the lever 48 and the driving claw 53 through the plunger 48 in the clockwise direction until the lever 49 comes in contact with one of the stoppers 52. The driving claw 53 and the ratchet teeth 55a are engaged with each other by the rotation of the driving claw 53 so that the ratchet wheel 55 is rotated in the clockwise direction. Thus, the connection projecting portion 58a of the connector 58 is pushed by one side portion of the connection claw 57 on an upper face of the ratchet wheel 55. Therefore, the driving cylindrical body 59 is rotated through the bosses 58b in the clockwise direction. The sector gear 45 is rotated by this rotation of the driving cylindrical body 59 through the gear portion 60 in the counterclockwise direction. The distance measuring optical system unit 41 is thus rotated by one step in the counterclockwise direction against the resilient force of the biasing spring 46.

FIGS. 13a to 13d are views for explaining a resetting operation of the distance measuring device in the second embodiment. When the optical system unit 41 is rotated by a predetermined number of steps in the above distance measuring operation, the connection projecting portion 58a is pushed and moved by the connection claw 57 from a position of the connection projecting portion shown in FIG. 13a to a position thereof shown in FIG. 13b. Then, the connection projecting portion 58a comes in contact with the operation slanting portion 62a of the reset cam 62. The connection projecting portion 58a is pushed upward by the operation slanting portion 62a within one of the grooves 59a of the driving cylindrical body 59. Thus, as shown FIG. 13c, the connection projecting portion 58a exceeds the slanting projection 57a of the connection claw 57. The distance measuring optical system unit 41 is biased by the biasing spring 46 so that the sector gear 45 is operated by the biasing force of the biasing spring 46 to return the driving cylindrical body 59 to an original position thereof. Therefore, the connection projecting portion 58a and the groove 59a of the driving cylindrical body 59 are moved on the connection claw 57 and come in contact with the slanting projection 57a of the preceding connection claw 57. The connection projecting portion 58a and the groove 59a of the driving cylindrical body 59 are then lowered by the pressing force of the pressure spring 61 and are returned to their original standby states shown in FIG. 13d.

In the above resetting operation, the number of steps is determined by a pitch of the ratchet teeth 55a of the ratchet wheel 55 and a pitch of the connection claws 57 such that the resetting operation is performed every this number of steps.

In FIG. 12, when the above releasing operation is performed and the lever 49 is rotated as mentioned above, the resilient force of a spring is first applied to the brake arm portion 63a of the brake claw body 63. Accordingly, the brake arm portion 63a comes in contact with the projecting arm 49a of the lever 49 in a position near the central shaft 50. The brake arm portion 63a is rotated by the projecting portion 49a around the shaft 64 in the counterclockwise direction. The entire brake claw body 63 is rotated by rotating the brake arm portion 63a by the rotation of the lever 49. The brake claw portion 63b is then engaged with the brake ratchet portion 65. Thus, it is possible to prevent the ratchet wheel 55 from being excessively rotated in each stepwise rotation thereof by using the brake claw portion 63b. The ratchet wheel 55 is rotated by a predetermined number of rotations and the rotation of the ratchet wheel 55 is then stopped.

Figure 14:
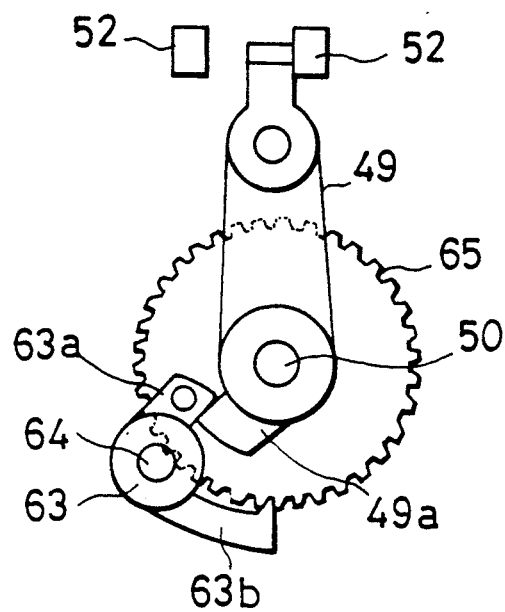
FIG. 14 is a constructional view of the lower structure of the ratchet wheel shown in FIG. 12 at an operating time of this ratchet wheel.

As mentioned above, the brake arm portion 63a first comes in contact with the projecting portion 49a in a position near the central shaft 50 so that the brake claw portion 63b is slowly moved. However, as shown in FIG. 14, the brake arm portion 63a comes in contact with the projecting portion 49a in a position near the shaft 64 in accordance with the rotation of the lever 49. In this case, the brake claw portion 63b is rapidly moved.

In FIG. 9, a reflecting mirror 66 can be arranged in front of the light-receiving element 43 to bend a light-receiving optical path 67 so as to prevent an increase in length of the optical path within the distance measuring optical system unit 41. In this case, it is possible to effectively provide a space for arranging a driving means composed of the sector gear 45, the solenoid device 47, the lever 49, the driving claw 53, the gear portion 60 of the driving cylindrical body 59, the ratchet wheel 55, etc. within a camera body. Accordingly, it is possible to bend one or both of an optical path 68 with respect to the light-emitting element 42 and the optical path 67 with respect to the light-receiving element 43 in accordance with a specification of the camera, an arrangement design of the above driving means, etc. Thus, the camera can be made compact and the space for the driving means can be secured.

Figure 15:
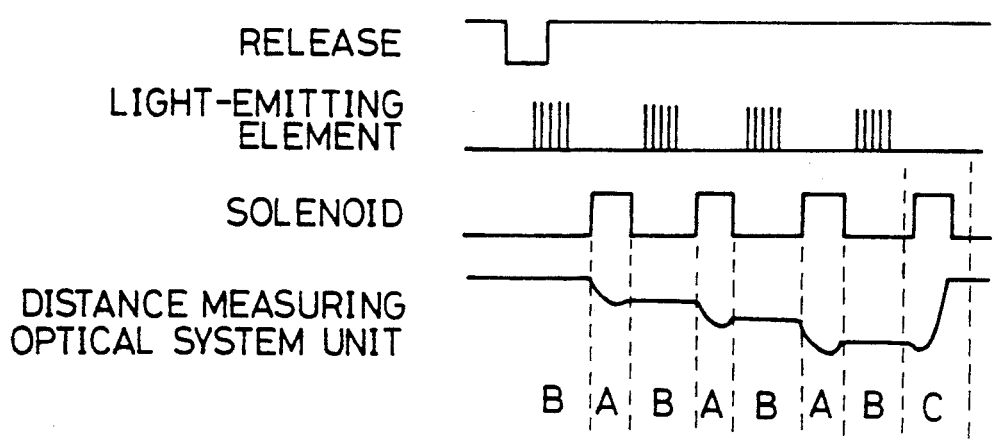
FIG. 15 is a timing chart of a main portion of the distance measuring device in the second embodiment of the present invention.

FIG. 15 is a timing chart of each of constructional portions in the distance measuring device of a camera in the above second embodiment. When a release switch is turned on, the light-emitting element 42 emits light plural times at a predetermined interval. The solenoid device 47 is operated in synchronization with a light-emitting operation of the light-emitting element 42. In FIG. 15, the above distance measuring optical system unit 41 is rotated as shown by reference numerals A and is at rest as shown by reference numerals B. Such rotating and resting operations of the distance measuring optical system unit 41 are repeatedly performed. The distance measuring operation is performed when the distance measuring optical system unit 41 is at rest. The distance measuring optical system unit 41 is reset as shown by reference numeral C at a final step time.

In the above second embodiment, the position of the distance measuring optical system unit 41 is returned to a standby position thereof after the distance measuring optical system unit 41 is rotated by a predetermined angle of rotation. Accordingly, it is possible to perform a pre-focusing operation in the distance measuring optical system unit 41 so that a multiple exposure operation can be performed. Further, the optical paths with respect to the light-emitting element 42 and the light-receiving element 43 are suitably bent so that it is possible to secure a space for arranging each constructional means for driving the distance measuring optical system unit 41 without increasing the size of the entire camera. The distance measuring optical system unit 41 is rotated in plural steps and is at rest in each of the plural steps. Accordingly, the multiple light-emitting operation for distance measurement can be performed so that the distance measuring operation can be exactly performed. Further, the distance measuring optical system unit can be at rest reliably and rapidly in each of the steps even when the distance measuring optical system unit is rotated at a high speed. Therefore, the distance measuring operation can be exactly and reliably performed for a short time.

Figure 16:
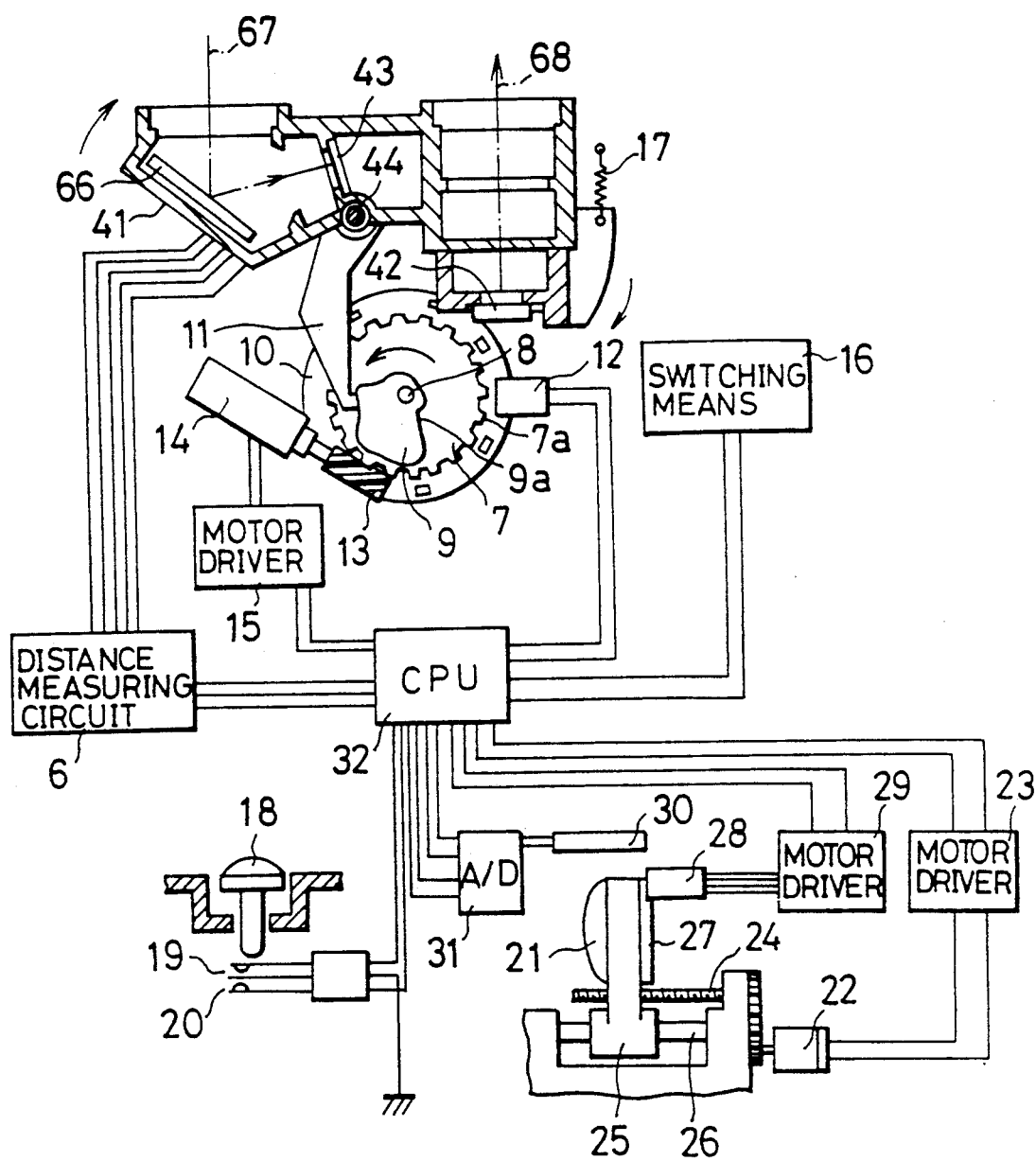
FIG. 16 is a view showing the entire construction of a distance measuring device of a camera in accordance with a third embodiment of the present invention.

FIG. 16 is a view showing the entire construction of a distance measuring device of a camera in accordance with a third embodiment of the present invention. In this third embodiment, the distance measuring optical system unit 41 in the second embodiment shown in FIG. 9 is connected to the driving and control systems of the distance measuring device in the first embodiment shown in FIG. 1.

In FIG. 16, constructional members corresponding to those described with reference to FIGS. 1 and 9 are designated by the same reference numerals and a detailed explanation thereof is therefor omitted in the following description. The distance measuring device in the third embodiment has a more practical construction. An operation of the distance measuring device in the third embodiment will be easily understood from a combination of the distance measuring optical system unit 41 in the second embodiment and the driving and control systems of the distance measuring device in the first embodiment.

As mentioned above, in accordance with a first structure of the present invention, it is possible to change distance measuring object ranges of a distance measuring optical system unit moved from one end of a photographing screen to the other end thereof to perform a distance measuring operation. Accordingly, the distance measuring operation can be suitably performed in accordance with the intention of an operator. Further, the distance measuring operation can be reliably performed at a suitable time by starting the distance measuring operation corresponding to a difference in distance measuring object range between one-point distance measurement and many-point distance measurement.

In accordance with a sixth structure of the present invention, the distance measuring optical system unit can be reset irrespective of a releasing operation thereof after the distance measuring optical system unit is rotated a predetermined angle to perform the distance measuring operation. Accordingly, it is possible to perform a pre-focusing operation in the distance measuring optical system unit and provide a camera having many functions of distance measurement in a wide region, multiple exposure, etc. Further, the distance measuring optical system unit is rotated by stages and is at rest at each of rotating stages. Accordingly, a many-point distance measuring operation can be exactly performed by emitting light multiple times when the distance measuring optical system unit is at rest.

In accordance with a ninth structure of the present invention, optical paths with respect to light-emitting and light-receiving elements can be bent to obtain a space for arranging a driving means for rotating the distance measuring optical system unit without increasing the size of a camera.

Further, in the above structures of the present invention, the distance measuring operation can be performed suitably and reliably in accordance with the intention of an operator and it is possible to provide an excellent distance measuring device of a practical camera.

Many widely different embodiments of the present invention may be constructed without departing from the spirit and scope of the present invention. It should be understood that the present invention is not limited to the specific embodiments described in the specification, except as defined in the appended claims.

What is claimed is:

1. A distance measuring device for a camera comprising:
    a rotatable distance measuring optical system unit for performing a distance measuring operation while moving from one end of a photographing screen to another end thereof;
    a driving means for rotating and stopping by stages said distance measuring optical system unit; and
    a switching means for switching distance measuring object ranges of said distance measuring optical system unit with respect to a one-point distance measurement and a many-point distance measurement;
    said driving means being adapted to stop said distance measuring optical system unit so as to perform said distance measuring operation in a case of said one-point distance measurement.

2. A distance measuring device according to claim 1, wherein said driving means stops said distance measuring optical system unit in such a manner that said distance measuring operation is performed on a central portion of said photographing screen in a case of said one-point distance measurement.

3. A distance measuring device according to claim 2, further comprising a first stage releasing switch, a second stage releasing switch, and a control means for controlling said distance measuring optical system unit in such a manner that said distance measuring operation is started by operation of one of said first stage releasing switch and said second stage releasing switch in accordance with said distance measuring object ranges.

4. A distance measuring device according to claim 3, wherein said control means controls said distance measuring optical system unit in such a manner that said distance measuring operation in started by operation of said second stage releasing switch in a case of said many-point distance measurement and is started by said operation of said first stage releasing switch in a case of said one-point distance measurement.

5. A distance measuring device according to claim 1, wherein said distance measuring optical system unit comprises a light-emitting element and a light-receiving element, and at least one optical path with respect to said light-emitting element and said light-receiving element is bent so as to obtain a space for arranging said driving means.

* * * * *